United States Patent [19]

Shapunov et al.

[11] 4,165,135
[45] Aug. 21, 1979

[54] METHOD OF UNLOADING BULK MATERIALS FROM VESSELS AND DEVICE FOR IMPLEMENTING SAME

[76] Inventors: Max M. Shapunov, ulitsa Frunze, 16, kv. 15; Mikhail A. Koppel, ulitsa Vosstania, 22, kv. 18; Felix M. Frumkin, ulitsa Prazhskaya, 34, kv. 93; Evgeny I. Zvenigorodsky, Vladimirsky prospekt, 11/10, kv. 15, all of Leningrad, U.S.S.R.; Antal Gabor, Ifjumunkash 9, Tatabanya U, Hungary

[21] Appl. No.: 871,394

[22] Filed: Jan. 23, 1978

[51] Int. Cl.² .............................................. B65G 53/42
[52] U.S. Cl. ....................................... 406/152; 406/85
[58] Field of Search ........................ 302/21, 23, 26, 34, 302/58

[56] References Cited

FOREIGN PATENT DOCUMENTS

| | | | |
|---|---|---|---|
| 1815935 | 8/1970 | Fed. Rep. of Germany | 302/58 |
| 161275 | 3/1964 | U.S.S.R. | 302/58 |
| 223631 | 10/1968 | U.S.S.R. | 302/58 |

Primary Examiner—Robert B. Reeves
Assistant Examiner—Jeffrey V. Nase
Attorney, Agent, or Firm—Fleit & Jacobson

[57] ABSTRACT

The method of unloading bulk materials from vessels resides in a mechanical loosening of the bulk material in the intake zone by virtue of vibration with a simultaneous supply of the aerating air in the direction of the inlet opening of a taking device, the aerating air being supplied pulsewise so that the frequency of pulses is synchronized with the material vibration frequency, taking the loosened and aerated bulk material through suction, and conveying the material by the air. A device carrying this method into effect comprises a sucking nozzle connected to the material conveying device, a loosening device made fast on the sucking nozzle, and an aerator attached to the loosening device. The loosening device is made as the frustum of a cone with its smaller base facing downwards and embracing the sucking nozzle, the lateral surface of the cone being formed by a number of spaced-apart separate ribs, whereas the inlet opening of the sucking nozzle is located below the loosening device. The aerator is located under the nozzle and is made as an annular tube with outlet holes facing the nozzle. Installed on the loosening device is a pneumatic vibrator whose inlet branch pipe is connected to a pressure line, while its outlet branch pipe is connected to the inlet opening of the aerator.

4 Claims, 3 Drawing Figures

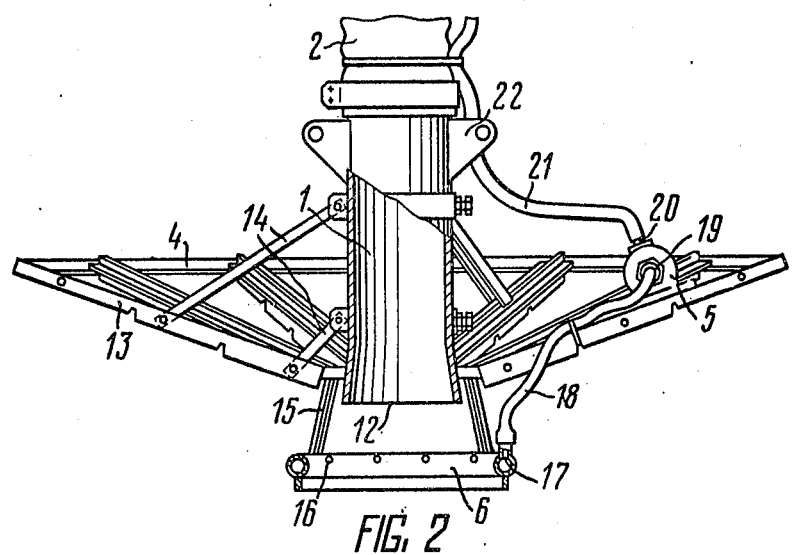
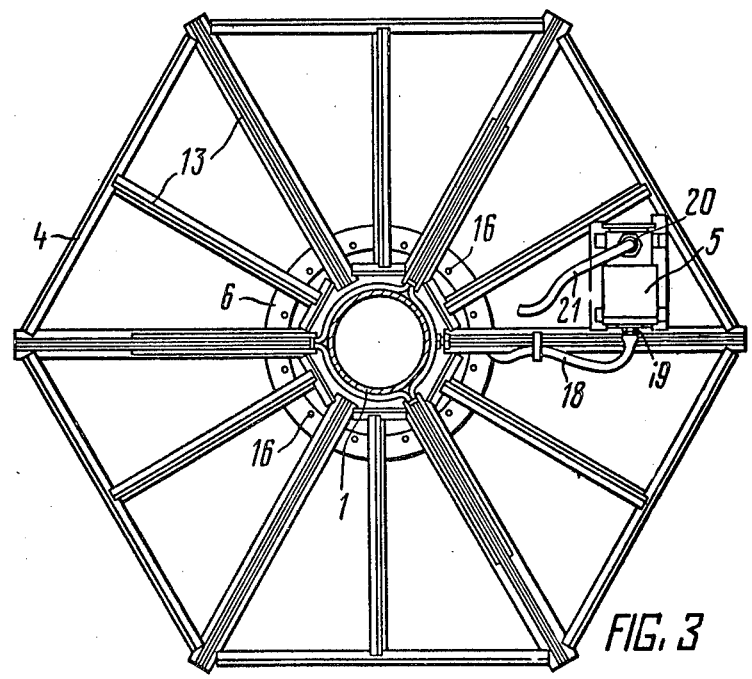

METHOD OF UNLOADING BULK MATERIALS FROM VESSELS AND DEVICE FOR IMPLEMENTING SAME

FIELD OF THE INVENTION

The present invention relates to pneumatic transport means and more particularly to methods of unloading bulk materials from vessels and to devices implementing this method.

The invention can most advantageously be used for unloading bulk materials from ships. The invention can also be used for unloading bulk materials from railway hopper cars.

BACKGROUND OF THE INVENTION

It is known that in any method of bulk material transportation and storage it is liable to get consolidated. This hinders its effective intake by any pneumatic transport methods during unloading. Therefore, when unloading a bulk material it is, as a rule, loosened and aerated to bring it in a fluidized state which is optimum for the pneumatic transportation.

For bulk material transportation a method is known to consist in that the mechanically pre-loosened material is aerated by an additional quantity of air supplied directly into the nozzle mouth.

A disadvantage of this method stems from the fact that the material transportation is intensified only in the accelerating portion of the nozzle. This can be effective only in combination with a mechanism, for example a worm feeder, used to supply the material from the suction zone to the zone of supply of the additional amount of aerating air, i.e., to the nozzle mouth. This complicates the construction of the pneumatic transport equipment and increases the cost of transportation.

A pneumatic transport installation for re-loading bulk materials from ships is known to comprise a sucking nozzle with a loosening means provided with an electric drive and a device for supplying air to the mouth of the sucking nozzle. This installation suffers from the same disadvantages as the above-mentioned method. In addition, the installation fails to provide an adequately efficient intake of material because the loosening performed mechanically by two rotable blades fails to secure a symmetrical feed of the material to the intake zone.

In another known method of unloading bulk materials from vessels, the material being unloaded is mechanically loosened and forced-aerated in the intake zone, i.e., under the taking means, the aerating air being supplied continuously in nondirectional flows. The mixture of the bulk material with air produced in the intake zone is sucked by the taking means, where a reduced pressure is maintained, and is transported by virtue of the air.

The device carrying this method into effect comprises a sucking nozzle communicated with a suction pump through a pipe line used as a means for transporting the material. The end of the sucking nozzle facing the material being unloaded has a bevelled edge, i.e., the plane of the inlet opening of the nozzle is at a certain angle to the horizontal plane so that the inlet opening of the nozzle is elliptical. A vertical hollow shaft driven by an electric motor and coupled with a pressure line is attached to the sucking nozzle on the size of the bevelled edge. The lower end of the shaft has a hollow disc rigidly installed thereon, which extends almost to the center of the inlet opening of the sucking nozzle. The disc is made of a porous cermet material. The lower extension of the hollow shaft protrudes into the disc so that the shaft interior and the disc interior are intercommunicated. The disc performs the function of both the loosening means and the aerator for the bulk material being unloaded.

The hollow shaft with the disc is rotated by a motor, and the disc loosens the material in the intake zone under the nozzle. In addition, air is supplied from the pressure line through the hollow shaft, said air emerging through the porous walls of the disc to aerate the material, thus producing a mixture of the material with the air. The material-and-air mixture is sucked by the nozzle and transported along the pipe line. The device has also a mechanism for moving the nozzle which provides the lowering of the nozzle as the material is unloaded, as well as the movement of the nozzle in other directions.

A disadvantage of the above method for unloading bulk materials and the device implementing this method consists in low efficiency of material intake due to low aerodynamic efficiency of the nozzle having a bevelled edge, as well as owing to non-uniform loosening and aeration of the material with respect to the longitudinal axis of the nozzle in the intake zone. This is accounted for by the fact that the porous disc performing the aeration and loosening covers only a portion of the inlet opening of the nozzle and the material under that part of the nozzle which is far from the disc is aerated and loosened worse than in the immediate vicinity of the disc. The non-symmetrical arrangement of the disc with respect to the sucking nozzle leads also to aeration of the material not only in the intake zone, but also in other zones where the intake is not performed, i.e. to losses of the aerating air. Said losses of the aerating air are also aggravated by the fact that the air is supplied through a porous disc in non-directional flows.

Moreover, the horizontal disc hampers the movement of the sucking nozzle into the material, especially when the material being unloaded is in the consolidated state.

The above disadvantages affect adversely the capacity of the material unloading and enhance the energy consumption for the unloading. Finally, such a constructional arrangement of the unloading device fails to provide its operational reliability and safety, especially when used in a bilge of the ship being unloaded, where there are metallic uprights, bulkheads, etc., since it has rotating elements, viz., the disc and the shaft, and current-conducting elements to supply voltage to the electric motor.

SUMMARY OF THE INVENTION

It is an object of the present invention to provide a method of unloading bulk materials from vessels and a device implementing this method, which ensure an increase in the unloading process capacity due to an increase in the efficiency of intake of the material being unloaded.

A further object of the invention is to reduce the amount of power for unloading bulk materials from vessels as a result of an economical consumption of the air used for aerating the material.

Another object of the invention is to increase the operational reliability and safety of the device for unloading bulk materials from vessels, as well as to simplify its construction.

With these and other objects in view, there is proposed a method for unloading bulk materials from vessels comprising a simultaneous mechanical loosening and forced aeration of the bulk material to be unloaded in the intake zone, taking the loosened and aerated material through suction of the taking means due to a vacuum maintained in the taking means, and transporting the material from the taking means by virtue of the air, wherein, according to the invention, the loosening of bulk material is performed by virtue of vibration, the aerating air being supplied towards the inlet opening of the taking means in pulses whose frequency is synchronized with the material vibration frequency.

The method proposed provides an intensive intake of material due to an efficient fluidization of the material in the intake zone as a result of the combined action on the material of the vibration and the pulsed aerating air supply. The pulsed air supply facilitates an additional loosening of the material since the energy developed by an individual pulsed air jet is higher than that of a continuous escape, and if the air supply pulses are synchronized with the vibration, then the forces acting on the material as a result of these two effects are added. The aerating air flows directed to the inlet opening of the taking means provide an economical air consumption.

It is desirable to vibrate the material and to supply the aerating air at a frequency within the range from 2 to 60 Hz. Said range is defined by the fact that, in case of vibration at frequency below 2 Hz, the material is loosened inadequately even when using highly friable material while the vibration at a frequency above 60 Hz results in its getting still more consolidated.

It is also desirable to ensure intersection of the aerating air flows at the longitudinal axis of the taking means. This contributes to a better material supply to the taking means.

With these and other objects in view, there is also proposed a device for unloading bulk materials from vessels, comprising a sucking nozzle connected with a material transportation means, a loosening means attached to the sucking nozzle, and an aerator connected to a pressure line, wherein, according to the invention, the loosening means is in effect the frustum of a cone with its smaller base facing downwards and embracing the sucking nozzle, the lateral surface of the cone being formed by a number of space-apart separate ribs and the inlet opening of the sucking nozzle being located below the loosening means, while the aerator is made as an annular tube provided with outlet holes and attached to the loosening means under the nozzle, said holes facing the nozzle, and is connected to a pressure line via a pneumatic vibrator installed on the loosening means.

The loosening means installed around the nozzle and made as the frustum of a cone with a ribbed surface provides a symmetrical supply of the loosened material to the inlet opening of the nozzle, while the annular aerator located under the nozzle and the air supply holes of the aerator facing the inlet opening of the nozzle provide a uniform material aeration in the intake zone, the entire aerating air being supplied to the intake zone.

Moreover, the construction of the loosening means and the aerator of the invention makes it easier to introduce the nozzle into the mass of the material being unloaded. The proposed device is simple and reliable in operation because of the use of the pneumatic vibrator as a drive of the loosening means. In the device proposed an economical power consumption is achieved also by using the spent air of the pneumatic vibrator as an aerating air.

In accordance with an embodiment of the invention the loosening means is fastened resiliently to the sucking nozzle in the tangential direction with respect to the sucking nozzle.

Such a fastening of the loosening means to the nozzle eliminates an undesirable axial and radial vibration components.

It is also desirable to arrange the outlet holes of the aerator equidistantly from each other and to orient these holes so that their axes cross at the longitudinal axis of the sucking nozzle. This provides a symmetrical aeration of the material with respect to the longitudinal axis of the sucking nozzle.

The invention will now be explained in greater detail with reference to a specific embodiment thereof, taken in conjunction with the accompanying drawings, wherein:

BRIEF DESCRIPTION OF THE DRAWINGS

FIG. 2 is an enlarged-scale view of the sucking nozzle with the loosening means and the aerator of the device of FIG. 1 and FIG. 3 is a top view of FIG. 2.

DESCRIPTION OF THE PREFERRED EMBODIMENT OF THE INVENTION

Figure 1:
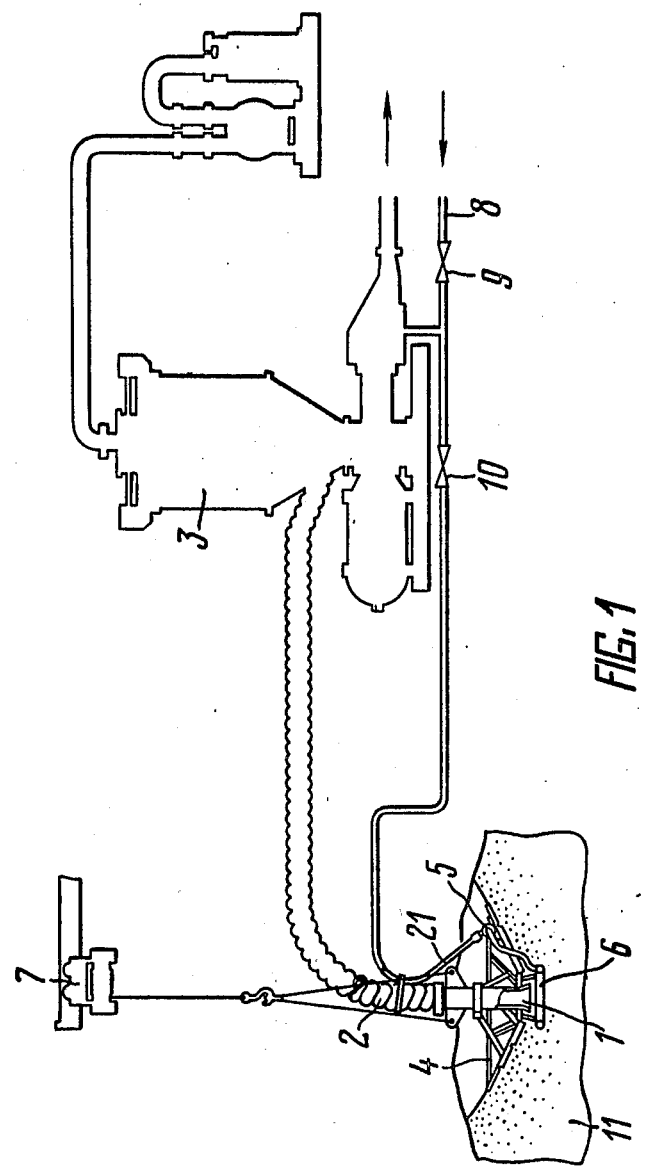
FIG. 1 is a general schematic view of the device for unloading bulk materials from vessels, according to the invention.

A method of unloading bulk materials from vessels, according to the invention is implemented as follows.

The taking means in which/terminates the sucking line of the device for unloading bulk material, kept continuously under vacuum, is sunk, for example, into the bilge of a ship filled with a bulk material. The taking means is brought in contact with the material and is immersed into the bulk of the material, whereas the material in front of the inlet opening of the taking means, i.e., in the intake zone, is loosened by vibration in the horizontal plane and by a simultaneous forced aeration. The aerating air is supplied in pulses towards the inlet opening of the taking means so that flows of the aerating air cross at the longitudinal axis of the taking means. The frequency of air supply pulses is synchronized with the frequency of material vibration and is set within the range from 2 to 60 Hz depending upon the material to be unloaded, for example, 8 Hz for a dust-like cement.

The material vibration at a frequency below 2 Hz fails to provide an efficient loosening of the material, while the vibration at frequency above 60 Hz contributes to consolidation of material.

A stable zone of fluidized material, i.e., of the loosened material saturated with air, is formed within the intake zone as a result of a combined action of the vibration and the pulsed aerating air flows on the material, which zone displaces as the taking means is displaced. The material fluidization proceeds intensely because the material is displaced with respect to the aerating air jets in synchronism with the vibration frequency due to sluggishness of the bulk of material being handled. An area of material considerably exceeding the cross-sectional area of the jet is, therefore, exposed to each of the air jets. Moreover, this causes a destruction of the channels being washed out by air jets in the material body, and the consolidated material between the jets is loosened. This facilitates the aeration process as well. The pulsed air supply contributes to the destruction of air channels, and the loosening and aeration of the material consolidated between jets proceeds more intensely, if the frequency of kicks experienced by the material due to the action of a next air pulse in the pulsed aeration is synchronized with the frequency of kicks caused by the vibration, in which case the forces of both are added.

The loosened and aerated material is sucked by the taking means in the intake zone and then are further transported by the air. The material intake is facilitated by the fact that the portion of the material which undergoes the direct action of the pulsed flow of aerating air displaces in the direction of the inlet opening of the taking means.

Referring now to FIG. 1, the device for unloading bulk material comprises a nozzle 1 connected through a flexible hose 2 to a material transportation means 3. Fastened on the sucking nozzle 1 is a loosening means 4 on which a pneumatic vibrator 5 is installed to ensure tangential direction of vibration of the pneumatic vibrator 5 and, hence, that of the loosening means 4 with respect to the nozzle 1. An aerator means 6 is disposed under the sucking nozzle 1 and is fitted to the loosening means 4.

The sucking nozzle 1 is supported by an electric telpher 7. However, any other hoisting mechanism may be used to move the nozzle 1.

In the embodiment of the invention being disclosed the material transportation means 3 is a common type sucking pressure installation which is connected to a pressure line 8 provided with shut-off valves 9 and 10. The pressure line 8 is used to feed the material transportation means 3 and to aerate a material 11 being unloaded. However, a sucking installation may be used as the transportation means 3, in this case the pressure line 8 being utilized only to aerate the material 11.

Referring to FIG. 2, the loosening means 4 is the frustum of a cone embracing the sucking nozzle 1 and installed with its smaller base facing downwards. An inlet opening 12 of the nozzle 1 is below the loosening means 4. The lateral surface of the loosening means 4 consists of spaced-apart separate ribs 13 (FIG. 3). The ribs 13 are joined to the housing of the sucking nozzle 1 by pulling rods 14 (FIG. 2) which are made stiff longitudinally and resilient laterally i.e., in the tangential direction with respect to the nozzle 1.

The aerator 6 is attached to the loosening means 4 through uprights 15 and is formed by an annular tube arranged concentrically with the nozzle 1 and provided with outlet holes 16 facing the nozzle 1 and spaced equidistantly. An inlet opening 17 of the aerator 6 is connected to an outlet branch pipe 19 (FIG. 3) of the pneumatic vibrator 5 through a flexible air duct 18. An outlet branch pipe 20 of the pneumatic vibrator 5 is connected to the pressure line 8 (FIG. 1) through a flexible air duct 21.

As it is shown in FIG. 2, the axes of the outlet holes 16 of the aerator 6 cross at the longitudinal axis of the sucking nozzle 1.

Welded to the housing of the nozzle 1 are lugs 22 for slinging (suspension) of the nozzle 1 to move it by the electric telpher 7 (FIG. 1).

The device proposed herein operates as follows. The material transportation means 3 is thrown into operation, and the valve 9 of the pressure line 8 is opened for compressed air to pass therethrough from any source (not shown). The sucking nozzle 1 is moved by the electric telpher 7 until it comes in contact with the material 11 to be unloaded and the inlet opening 12 (FIG. 2) is pressed against the material 11 (FIG. 1). This allows vacuum in the nozzle 1 to be increased up to the working value, as well as that in the hose 2. The aerator 6 embeds into the material to be unloaded 11.

The shut-off valve 10 of the pressure line 8 is opened, and the compressed air is fed through the air duct 21 to the pneumatic vibrator 5 and activates it, thus causing the vibration of the pneumatic vibrator 5 and, hence, that of the loosening means 4 with the ribs 13 (FIG. 2) and of the aerator 6 in the tangential direction with respect to the sucking nozzle 1. The material 11 to be unloaded (FIG. 1) in the intake zone which undergoes the simultaneous action of vibration in the horizontal plane and a directed air jets escaping from the outlet holes 16 (FIG. 2) of the aerator 6 is loosened and saturated uniformly with air. The aerated material is sucked by the nozzle 1 and is transported through the flexible hose 2 (FIG. 1) to the transportation means 3 and further on to the place of unloading.

The surface of the carter formed by the ribs 13 (FIG. 3) of the vibrating loosening means 4 in the bulk of the material being unloaded 11, when it is taken, crumbles continuously; the crumbled material gets into the space between the inlet opening 12 (FIG. 2) of the nozzle 1 and the aerator 6 where it undergoes the action described above and is sucked by the nozzle 1, thus giving place to a new layer of the material 11 (FIG. 1) crumbling from under the loosening means 4.

The invention proposed substantially increases the capacity of unloading of bulk materials, without an increase in power consumption, reduces the time required for unloading ships, as well as increases the safety and reliability in service since the unloading device has no current-conducting and rotating components.

While a particular embodiment of the invention has been shown and described, various modifications thereof will be apparent to those skilled in the art and therefore it is not intended that the invention be limited to the disclosed embodiment or to the details thereof and the departures may be made therefrom within the spirit and scope of the invention as defined in the appended claims.

What is claimed is:

1. A device of unloading a bulk material from vessels, comprising:
   a sucking nozzle for taking said bulk material to be transported;
   a bulk material transportation means connected to said sucking nozzle;
   a means for loosening said bulk material being attached to said sucking nozzle and embracing said sucking nozzle so that an inlet opening of said sucking nozzle is disposed below said loosening means;
   said loosening means being made as the frustum of a cone installed with its smaller base facing downwards, while the lateral surface of said cone is formed by a number of spaced-apart separate ribs;
   a means for supplying aerating air into said bulk material, being attached to said loosening means and installed under said sucking nozzle;
   said aerating air supply means being made as an annular tube having an inlet opening and provided with a plurality of outlet holes facing said sucking nozzle;

a pneumatic vibrator attached to said loosening means and having an inlet branch pipe and an outlet branch pipe, said outlet branch pipe of said pneumatic vibrator being connected to said inlet opening of said aerating air supply means; and a pressure line connected to said inlet branch pipe of said pneumatic vibrator.

2. A device for unloading bulk materials as defined in claim 1 which comprises further rods used to attach said loosening means to said sucking nozzle; said rods being made resilient in the tangential direction with respect to said sucking nozzle.

3. A device for unloading bulk materials as defined in claim 2, wherein said outlet holes of said aerating air supply means are spaced equidistantly from each other, while the axes of said holes cross at the longitudinal axis of said sucking nozzle.

4. A device for unloading bulk materials as defined in claim 1, wherein said outlet holes of said aerating air supply means are spaced equidistantly from each other, while the axes of said holes cross at the longitudinal axis of said sucking nozzle.

* * * * *